United States Patent
Honda et al.

(10) Patent No.: US 9,543,077 B2
(45) Date of Patent: Jan. 10, 2017

(54) SEPARATOR WITH HEAT RESISTANT INSULATION LAYER

(71) Applicant: NISSAN MOTOR CO., LTD., Kanagawa (JP)

(72) Inventors: Takashi Honda, Kawasaki (JP); Kazuki Miyatake, Yokohama (JP); Haruyuki Saito, Yokohama (JP); Tamaki Hirai, Yokohama (JP); Hironobu Muramatsu, Tokyo (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 320 days.

(21) Appl. No.: 14/356,254

(22) PCT Filed: Oct. 9, 2012

(86) PCT No.: PCT/JP2012/076089
§ 371 (c)(1),
(2) Date: May 5, 2014

(87) PCT Pub. No.: WO2013/069399
PCT Pub. Date: May 16, 2013

(65) Prior Publication Data
US 2014/0287295 A1    Sep. 25, 2014

(30) Foreign Application Priority Data
Nov. 10, 2011 (JP) .................... 2011-246299

(51) Int. Cl.
*H01M 2/16* (2006.01)
*H01G 11/52* (2013.01)
*B32B 5/02* (2006.01)
*B32B 5/30* (2006.01)
*H01M 10/052* (2010.01)

(52) U.S. Cl.
CPC .............. *H01G 11/52* (2013.01); *B32B 5/022* (2013.01); *B32B 5/024* (2013.01); *B32B 5/30* (2013.01);
(Continued)

(58) Field of Classification Search
CPC ... H01M 2/1686; H01M 2/166; H01M 10/052
See application file for complete search history.

(56) References Cited

U.S. PATENT DOCUMENTS

| 4,726,912 A | 2/1988 | Bishop et al. |
| 6,200,706 B1 * | 3/2001 | Ashida ............... D04H 1/54 |
| | | 429/247 |

(Continued)

FOREIGN PATENT DOCUMENTS

| CN | 101317284 A | 12/2008 |
| CN | 102124591 A | 7/2011 |

(Continued)

OTHER PUBLICATIONS

Communication with extended European search report dated Jan. 30, 2015 from the corresponding European Application No. 12847129.9.

(Continued)

*Primary Examiner* — Helen O Conley
(74) *Attorney, Agent, or Firm* — Young Basile Hanlon & MacFarlane, P.C.

(57) ABSTRACT

A separator with a heat resistant insulation layer includes a porous substrate, and a heat resistant insulation layer formed on one surface or both surfaces of the porous substrate and containing at least one kind of inorganic particles and at least one kind of a binder, wherein a content mass ratio of the inorganic particles to the binder in the heat resistant insulation layer is in a range from 99:1 to 85:15, a BET specific surface area of the inorganic particles is in a range from 3

(Continued)

$m^2/g$ to 50 $m^2/g$, and a ratio of the moisture content per mass of the binder to the BET specific surface area of the inorganic particles is greater than 0.0001 and smaller than 2.

10 Claims, 3 Drawing Sheets

(52) U.S. Cl.
CPC ........... *H01M 2/166* (2013.01); *H01M 2/1686* (2013.01); *B32B 2260/025* (2013.01); *B32B 2260/046* (2013.01); *B32B 2264/102* (2013.01); *B32B 2264/105* (2013.01); *B32B 2307/304* (2013.01); *B32B 2307/306* (2013.01); *B32B 2457/10* (2013.01); *H01M 10/052* (2013.01); *Y02E 60/13* (2013.01); *Y02T 10/7011* (2013.01); *Y02T 10/7022* (2013.01)

(56) References Cited

U.S. PATENT DOCUMENTS

| | | |
|---|---|---|
| 7,883,799 B2 | 2/2011 | Seo et al. |
| 8,318,360 B2 | 11/2012 | Seo et al. |
| 8,771,859 B2 | 7/2014 | Matsumoto et al. |
| 8,815,435 B2 | 8/2014 | Nishikawa |
| 2007/0122716 A1 | 5/2007 | Seo et al. |
| 2011/0003209 A1 | 1/2011 | Katayama et al. |
| 2011/0045168 A1 | 2/2011 | Seo et al. |
| 2011/0143183 A1 | 6/2011 | Matsumoto et al. |
| 2011/0143185 A1 | 6/2011 | Nishikawa |

FOREIGN PATENT DOCUMENTS

| | | |
|---|---|---|
| CN | 102160211 A | 8/2011 |
| JP | 2010065088 A | 3/2010 |
| JP | 2010232048 A | 10/2010 |
| JP | 2010240936 A | 10/2010 |
| JP | 2011-071009 A | 4/2011 |
| KR | 20070055979 A | 5/2007 |
| WO | 2008029922 A1 | 3/2008 |
| WO | 2010104127 A1 | 9/2010 |

OTHER PUBLICATIONS

J. C. Hooton, "Carboxymethylcellulose Sodium", Feb. 3, 2009, pp. 118-121, (D5).

* cited by examiner

SEPARATOR WITH HEAT RESISTANT INSULATION LAYER

CROSS REFERENCE TO RELATED APPLICATION

The present application claims priority to Japanese Patent Application No. 2011-246299, filed Nov. 10, 2011 and incorporated herein in its entirety.

TECHNICAL FIELD

The present invention relates to a separator with a heat resistant insulation layer. More particularly, the present invention relates to a separator with a heat resistant insulation layer suitable for use in an electric device such as a lithium ion secondary battery or an electric double-layer capacitor.

BACKGROUND

In recent years, hybrid vehicles (HEV), electric vehicles (EV) and fuel cell vehicles have been manufactured and sold in view of environmental effects and fuel consumption, and further development of these vehicles is being carried out. In such electric-powered vehicles, the use of chargeable-dischargeable power supply systems is essential. As for such power supply systems, secondary batteries such as lithium ion batteries and nickel hydride batteries, and electric double-layer capacitors are generally used. Among these, lithium ion secondary batteries are particularly suitable for used in electric-powered vehicles because of high energy density and high resistance to repeated charge and discharge, and recent batteries tend to have much higher capacity.

Such lithium ion secondary batteries have a configuration in which a positive electrode and a negative electrode are connected via an electrolyte layer and these are housed in a battery case. The electrolyte layer may include a separator in which an electrolysis solution is held. The separator is required not only to hold the electrolysis solution to ensure lithium ion conductivity between the positive electrode and the negative electrode but also to serve as a partition between the positive electrode and the negative electrode.

Separators are being developed that have a shutdown function to stop a charge-discharge reaction when batteries reach high temperature. The shutdown function is to prevent movement of lithium ions between the electrodes. In particular, when a battery reaches high temperature, resin contained in the separator is dissolved and pores are then filled with the resin so that a shutdown is carried out. Therefore, the material used in the separator having such a shutdown function is generally thermoplastic resin such as polyethylene (PE) or polypropylene (PP).

Here, it is well known that such a separator containing thermoplastic resin has a problem with mechanical strength due to the flexibility of the material. In particular, the separator is thermally contracted under high temperature conditions, and the positive electrode and the negative electrode interposing the separator therebetween come into contact with each other so that an internal short circuit may be occurred. In view of such a problem, there is proposed a method of forming a heat resistant insulation layer containing insulation inorganic particles and an organic binder as main components and interposed between the separator and the respective electrodes.

Such a separator may have influence on cycle performance and output performance when applied to a battery because the adsorption moisture amount in the separator is higher than that of a separator only including a porous substrate due to the presence of the heat resistant insulation layer containing the inorganic particles and the binder. With regard to measures to control a moisture content in a separator with a heat resistant insulation layer, International Publication WO 08/029,922 discloses a method of performing hydrophobic treatment on surfaces of inorganic fine particles. Japanese Patent Unexamined Publication No. 2010-232048 also discloses a method relating thereto.

SUMMARY

However, the methods disclosed in these documents cannot sufficiently prevent the problem caused in association with the increase of the adsorption moisture amount in the separator.

An object of the present invention is to provide a separator with a heat resistant insulation layer capable of sufficiently preventing a problem caused in association with an increase of the adsorption moisture amount in the separator.

A separator with a heat resistant insulation layer according to a first aspect of the present invention includes a porous substrate, and a heat resistant insulation layer formed on one surface or both surfaces of the porous substrate and containing inorganic particles and a binder, wherein a content mass ratio of the inorganic particles to the binder in the heat resistant insulation layer is in a range from 99:1 to 85:15, a BET specific surface area of the inorganic particles is in a range from 3 $m^2/g$ to 50 $m^2/g$, and a ratio of a moisture content per mass of the binder to the BET specific surface area of the inorganic particles is greater than 0.0001 and smaller than 2.

DESCRIPTION OF EMBODIMENTS

Hereinafter, preferred embodiments of the present invention will be explained in detail. It should be noted that the present invention is not limited to the embodiments described below, and various modifications can be made within the scope of the present invention.

Figure 1:
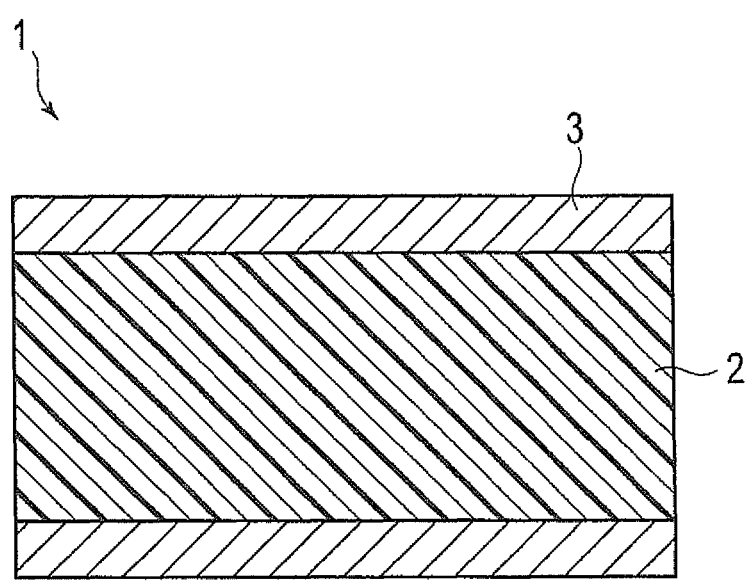
FIG. 1 is a schematic cross-sectional view showing a separator with a heat resistant insulation layer according to an embodiment.

FIG. 1 shows a schematic cross-sectional view of a separator with a heat resistant insulation layer according to an embodiment of the present invention. As shown in FIG. 1, the separator with a heat resistant insulation layer 1 of the present embodiment includes a resins porous substrate 2 and heat resistant insulation layers 3 formed on the upper surface and the lower surface of the resin porous substrate 2.

The following is a specific explanation of each element of the separator with a heat resistant insulation layer according to the present invention.

[Heat Resistant Insulation Layer]

A heat resistant insulation layer is a ceramic layer containing inorganic particles and a binder. The presence of the heat resistant insulation layer can prevent heat contraction since internal stress of the separator which increases with an increase in temperature reduces. Further, the presence of the heat resistant insulation layer increases the mechanical strength of the separator with a heat resistant insulation layer so that the film of the separator is hardly damaged. The heat contraction prevention effect and the mechanical strength prevent the separator from being curled during the manufacture of an electric device.

A content mass ratio of the inorganic particles to the binder in the heat resistant insulation layer is in the range from 99:1 to 85:15. If the content of the binder for solidifying the heat resistant insulation layer exceeds 15% by mass with respect to the total mass of the inorganic particles and the binder, the binder fills gaps between the inorganic particles so as to cause insufficient lithium ion permeability. This adversely influences charge and discharge at relatively large current necessary for electric vehicles and as a result, the output performance decreases. In addition, since a side reaction due to excessive voltage at positive and negative electrodes is easily caused, long cycle life may not be obtained sufficiently. If the amount of the binder for solidifying the heat resistant insulation layer is less than 1% by mass with respect to the total mass of the inorganic particles and the binder, the binder is not sufficient to bind the inorganic particles, and the heat resistant insulation layer for preventing further heat generation when the temperature keeps increasing after exceeding a shutdown temperature, may easily come off. In view of the output performance, the content mass ratio of the inorganic particles to the binder is preferably in the range from 95:5 to 90:10 (mass ratio).

When the adsorption moisture amount increases because of the inorganic particles and the binder in the heat resistant insulation layer, in particular, the long cycle performance may decrease. Thus, controlling the adsorption moisture amount in the heat resistant insulation layer is a quite important issue in the separator with a heat resistant insulation layer.

Here, the inventors found out that the balance of the adsorption moisture amount derived from the inorganic particles and the adsorption moisture amount derived from the binder, is extremely important. The inventors thus focused on the holding amount of moisture that the inorganic particles and the binder in the heat resistant insulation layer each inherently have. Accordingly, the inventors found out that it is particularly important with regard to the cycle performance that the amount of moisture that the binder can hold is determined according to the moisture content per mass of the binder, and the ratio of the moisture content per mass of the binder to the BET specific surface area of the inorganic particles is set to a predetermined range. In particular, the inventors found out that the ratio of the moisture content per mass of the binder to the BET specific surface area of the inorganic particles (hereinafter, also referred to as a moisture balance ratio) is set to be greater than 0.0001 and smaller than 2 so as to improve the output performance of the cell and improve the long cycle performance. The ratio set to such a range is conceived to contribute to decreasing the amount of gas generation during the initial charge and improving the cycle performance since a fine SEI film is formed evenly in a plane.

If the moisture balance ratio is 2 or greater, the cell performance (the output performance and the long cycle performance) deteriorates. This may be because a reaction between salt ($LiPF_6$) and water in the electrolysis solution is easily occurred and the generation amount of gas such as HF increases. It should be noted that the above-described mechanism is a presumption and the present invention is not limited thereto. If the moisture balance ratio is 0.0001 or smaller, the battery reaction is unevenly occurred, which causes a reduction in capacity. This is because static electricity is easily produced so that the separator is easily wrinkled between the electrodes at the time of assembly of the battery. It should be noted that the above-described mechanism is a presumption and the present invention is not limited thereto.

In view of the long cycle performance, the moisture balance ratio is preferably greater than or equal to 0.001, more preferably greater than or equal to 0.1. In view of the long cycle performance, the moisture balance ratio is preferably smaller than or equal to 1.8, more preferably smaller than or equal to 1.

The moisture content per mass of the binder is measured as follows. First, the binder used in the heat resistant insulation layer is kept under an air atmosphere at a temperature of 25° C. and at relative humidity of 50% for 24 hours. Then, the moisture content thereof is measured by a coulometric titration method with a Karl Fischer moisture meter (CA-200, manufactured by Mitsubishi Chemical Analytech Co., Ltd.) according to a Karl Fischer method. By dividing the value thus obtained by the mass of the binder used in this measurement, the moisture content per mass of the binder can be obtained.

The BET specific surface area of the inorganic particles in this description is measured by the method described in examples. The BET specific surface area of the inorganic particles is in the range from 3 $m^2/g$ to 50 $m^2/g$. Therefore, the moisture content per mass of the binder is greater than 0.0003% by mass and smaller than 100% by mass.

The thickness of the heat resistant insulation layer is determined as appropriate depending on the type and intended use of the battery and is not particularly limited. For example, the total thickness of the heat resistant insulation layers formed on both surfaces of the resin porous substrate is approximately in the range from 5 μm to 200 μm. When applied to a secondary battery for driving a motor for use in, for example, an electric vehicle (EV) and a hybrid electric vehicle (HEV), the total thickness of the heat resistant insulation layers formed on both surfaces of the resin porous substrate is, for example, in the range from 5 μm to 200 μm, preferably in the range from 5 μm to 20 μm, more preferably in the range from 6 μm to 10 μm. The heat resistant insulation layers with the total thickness within such a range can increase the mechanical strength in the thickness direction and ensure higher output performance.

The weight of the heat resistant insulation layers is not particularly limited, but preferably in the range from 5 $g/m^2$ to 15 $g/m^2$, more preferably in the range from 9 $g/m^2$ to 13 $g/m^2$. The weight within such a range is preferred in view of the capability to ensure sufficient ion conductivity and keep the strength of the heat resistant insulation layers.

The heat resistant insulation layer may contain another component as necessary in addition to the inorganic particles and the binder. The other component may be organic particles having heat resistance. Examples of the organic particles (organic powder) having a melting point or a thermal softening point of 150° C. or higher include several types of cross-linked polymer particles such as cross-linked polymethyl methacrylate, cross-linked polystyrene, cross-linked polydivinylbenzene, a cross-linked styrene-divinylbenzene copolymer, polyimide, melamine resin, phenol resin and a benzoguanamine-formaldehyde condensation product, and organic resin particles such as heat resistant polymer particles including polysulfone, polyacrylonitrile, polyaramid, polyacetal and thermoplastic polyimide. The organic resin (polymer) contained in these organic particles may be a mixture, a modified product, a derivative, a copolymer (a random copolymer, an alternating copolymer, a block copolymer, a graft copolymer), or a cross-linked product (in the case of the heat resistant polymer fine particles) of the above-exemplified materials. Among these, particles of cross-linked polymethyl methacrylate and polyaramid are preferably used as the organic particles in view of industrial productivity and electrochemical stability. Due to such organic resin particles, the separator mainly containing resin can be manufactured, which contributes to a reduction in weight of the battery as a whole.

(Inorganic Particles) The inorganic particles are a constituent element of the heat resistant insulation layer to provide the mechanical strength and the heat contraction prevention effect to the heat resistant insulation layer. The inorganic particles use a material having high heat resistance with a melting point or a thermal softening point of 150° C. or higher, preferably 240° C. or higher. The material having high heat resistance can effectively prevent contraction of the separator even when the temperature inside the battery reaches nearly 150° C. Accordingly, the battery that hardly causes a decrease in performance by a temperature increase can be obtained since generation of a short circuit between the electrodes in the battery can be prevented.

The inorganic particles are not particularly limited, and conventionally-known materials may be used. Examples of the inorganic particles include an oxide, a hydroxide and a nitride of silicon, aluminum, zirconium or titanium, and a complex thereof. The oxide of silicon, aluminum, zirconium or titanium may be silica ($SiO_2$), alumina ($Al_2O_3$), zirconia ($ZrO_2$), or titania ($TiO_2$). These inorganic particles may be used alone or in combination of two or more. Among these, the inorganic particles are preferably silica or alumina in view of cost effectiveness.

The BET specific surface area of the entire inorganic particles is smaller than or equal to 50 $m^2/g$. If the BET specific surface area of the inorganic particles exceeds 50 $m^2/g$, the inorganic particles absorb an electrolysis solution so as to swell easily. As a result, the binding performance between the inorganic particles and the binder decreases and separation of the inorganic particles is easily caused. The separation of the inorganic particles leads to a reduction in discharge capacity when charge and discharge are repeated. This is a critical issue particularly for lithium ion secondary batteries for use in vehicles required to have long cycle performance. The BET specific surface area of the inorganic particles is more preferably 30 $m^2/g$ or smaller, even more preferably 15 $m^2/g$ or smaller.

The lower limit of the BET specific surface area of the inorganic particles is greater than or equal to 3 $m^2/g$. If the BET specific surface area of the inorganic particles is smaller than 3 $m^2/g$, the contact area with the binder decreases and the separation of the inorganic particles is easily caused. As a result, the cell resistance further increases and the discharge capacity maintenance ratio decreases. As described above, the decrease of the discharge capacity maintenance ratio is a critical issue particularly for the lithium ion secondary batteries for use in vehicles required to have long cycle performance. Here, the BET specific surface area of the inorganic particles may be easily controlled in such a manner as to control a baking temperature or the like of the raw material such as aluminum hydroxide.

The inorganic particles are preferably fine particles in view of dispersibility, and the fine particles used may have an average (secondary) particle diameter, for example, in the range from 100 nm to 4 μm, preferably in the range from 300 nm to 3 μm, more preferably in the range from 500 nm to 3 μm. Note that the average particle diameter employs a value of a 50%-cumulative particle diameter measured by a laser diffraction particle size analyzer.

The shape of the inorganic particles is not particularly limited and may be a spherical, plate-like, rod-like or needle-like shape.

(Binder) The binder is a constituent element of the heat resistant insulation layer to function to bind the adjacent inorganic particles together and bind the inorganic particles to the porous substrate. The binder contributes to stabilization of the heat resistant insulation layer and improvement in resistance to separation between the porous substrate and the heat resistant insulation layer. The binder is preferably a material capable of binding the inorganic particles, insoluble in the electrolysis solution in the lithium ion secondary battery, and electrochemically stable in the use of the lithium ion secondary battery.

The binder is not particularly limited, and conventionally-known materials may be used. Examples of the binder include polyolefin such as polyethylene and polypropylene, fluorine resin such as polyvinylidene fluoride (PVDF), polytetrafluoroethylene (PTFE) and polyvinyl fluoride (PVF), fluoro rubber such as a vinylidene fluoride-hexafluoropropylene-tetrafluoroethylene copolymer and an ethylene-tetrafluoroethylene copolymer, rubber such as a styrene-butadiene copolymer and hydride thereof, an acrylonitrile-butadiene copolymer and hydride thereof, an acrylonitrile-butadiene-styrene copolymer and hydride thereof, a methacrylic ester-acrylic ester copolymer, a styrene-acrylic ester copolymer, an acrylonitrile-acrylic ester copolymer, ethylene propylene rubber, polyvinyl alcohol and polyvinyl acetate, resin such as polyphenylene ether, polysulfone, polyether sulfone, polyphenylene sulfide, polyether imide, polyamide imide, polyamide, polyester, polyacrylonitrile, cellulose, an ethylene-vinyl acetate copolymer, polyvinyl chloride, isoprene rubber, butadiene rubber, polymethyl acrylate, polyethyl acrylate and polyvinyl alcohol, and a water-soluble polymer such as carboxymethylcellulose (CMC), acrylamide, polyvinyl alcohol, methylcellulose, guar gum, sodium alginate, carrageenan, xanthane gum and salt thereof. These materials may be used alone or in combination of two or more. Among these binders, the water-soluble polymer, PVDF, polymethyl acrylate and polyethyl acrylate are preferable. These binders are preferred because of high heat resistance. These binders may be used alone or in combination of two or more.

Particularly, the water-soluble polymer is favorable because it is a low-priced material and is not required to use an organic solvent as a slurry solvent at the time of manufacture. However, the inventors found out that, when the water-soluble polymer is used, the moisture content in the heat resistant insulation layer still increases even if the content of the binder is set to low according to the present invention since the water-soluble polymer has a high adsorption moisture amount. In view of such a problem, the moisture balance ratio in the heat resistant insulation layer is controlled so as to decrease the moisture content in the heat resistant insulation layer even when the water-soluble polymer having a high adsorption moisture amount is used.

Among the water-soluble polymers, carboxymethylcellulose and/or salt thereof is preferable. The weight average molecular weight of the water-soluble polymer is preferably in the range from 5000 to 1000000 in view of binding performance. Here, the weight average molecular weight is measured by a gel permeation chromatography method (a GPC method). When carboxymethylcellulose (salt) is used as a binder, the ratio of the moisture content per mass of the binder to the BET specific surface area of the inorganic particles (the moisture balance ratio) is preferably in the range from 0.75 to 1.9, more preferably in the range from 1 to 1.8 in view of cycle performance.

[Porous Substrate]

The porous substrate provides a shutdown function to the separator with a heat resistant insulation layer.

The material of the porous substrate is not particularly limited. For example, the material may be polyethylene (PE), polypropylene (PP), or a copolymer obtained by copolymerizing ethylene and propylene (an ethylene-propylene copolymer) as a monomer unit. Alternatively, a copolymer obtained by copolymerizing ethylene or propylene and a monomer other than ethylene and propylene may be used. In addition, resin or thermoset resin having a melting temperature exceeding 200° C. may be contained as long as resin having a melting temperature in the range from 120° C. to 200° C. is contained. Examples of the material include polystyrene (PS), polyvinyl acetate (PVAc), polyethylene terephthalate (PET), polyvinylidene fluoride (PVDF), polytetrafluoroethylene (PTFE), polysulfone (PSF), polyether sulfone (PES), polyetheretherketone (PEEK), polyimide (PI), polyamideimide (PAI), phenol resin (PF), epoxy resin (EP), melamine resin (MF), urea resin (UF), alkyd resin, and polyurethane (PUR). In this case, the ratio of the resin having a melting temperature in the range from 120° C. to 200° C. to the entire porous substrate is preferably 50% by mass or greater, more preferably 70% by mass or greater, still more preferably 90% by mass or greater, particularly preferably 95% by mass or greater, most preferably 100% by mass. Alternatively, the porous substrate may be formed in such a manner as to stack the materials described above. An example of the porous substrate having a stacked structure may be a porous substrate having a triple-layer structure of PP/PE/PP. In this porous substrate, a shutdown occurs when the battery temperature reaches 130° C. which is a melting point of PE. The entire short circuit can be prevented even if the battery temperature keeps increasing after the shutdown since meltdown is not caused until the battery temperature reaches 170° C. which is a melting point of PP.

The configuration of the porous substrate is not particularly limited and may be at least one kind selected from the group consisting of woven fabric, nonwoven fabric and a microporous film. In order to ensure high ion conductivity in the porous substrate, the porous substrate preferably has a high porosity structure. Accordingly, in view of an improvement in battery performance, the configuration of the porous substrate is preferably a microporous film.

The porosity of the porous substrate is preferably in the range from 40% to 85%. The porosity of 40% or higher can ensure sufficient ion conductivity. The porosity of 85% or lower can keep the strength of the porous substrate.

The porous substrate may be manufactured by a conventionally-known method. Examples of the method include a stretch pore-forming method and a phase separation method for producing a microporous film, and an electro-spinning method for producing nonwoven fabric.

The separator with a heat resistant insulation layer functions to insulate electronic conductivity between the positive and negative electrodes. The total thickness of the separator is preferably reduced to a certain extent in view of the improvement in battery performance. In particular, the total thickness of the separator is preferably in the range from 10 μm 50 μm, more preferably in the range from 15 μm to 30 μm. The total thickness of 10 μm or greater can ensure the strength of the separator. The total thickness of 50 μm or smaller can contribute to the formation of a small-size battery.

The separator with a heat resistant insulation layer is manufactured by a conventionally-known method. In this case, the heat resistant insulation layer may be formed only on one surface or on both surfaces of the porous substrate. Further, another layer may be interposed between the porous substrate and the heat resistant insulation layer, which is also included in the scope of the present invention. When such a third layer is interposed, the total thickness also includes the thickness of the third layer.

With regard to a specific manufacture method, for example, the separator with a heat resistant insulation layer may be manufactured in a manner such that a solution obtained by dispersing the organic particles and the binder in a solvent is applied to the porous substrate, and the solvent is then removed therefrom.

The solvent used in this case is not particularly limited, but examples thereof include N-methyl-2-pyrrolidone (NMP), dimethylformamide, dimethylacetamide, methylformamide, cyclohexane, hexane, and water. When polyvinylidene fluoride (PVDF) is used as a binder, NMP is preferably used as a solvent. The temperature at which the solvent is removed is not particularly limited and may be determined as appropriate depending on the solvent used. For example, the temperature may be in the range from 50° C. to 70° C. when water is used as a solvent, and the temperature may be in the range from 70° C. to 90° C. when NMP is used as a solvent. The solvent may be removed under reduced pressure as necessary. Here, the solvent may partly be left without completely removed.

[Electric Device]

The separator with a heat resistant insulation layer can be used for an electric device. The separator with a heat resistant insulation layer may be preferably used for a lithium ion secondary battery. The electric device using the separator with a heat resistant insulation layer according to the present invention can ensure high output performance, keep a discharge capacity even when used for a long period of time, and have high cycle performance due to the controlled adsorption moisture amount of the separator.

First, a non-aqueous electrolyte lithium ion secondary battery is explained below as a preferred embodiment of the electric device; however, the electric device is not limited only to the following embodiment. It should be noted that the same elements in the explanations of the drawings are indicated by the same reference numerals, and overlapping explanations thereof are not repeated. In addition, dimensional ratios in the drawings are magnified for convenience of explanation and may be different from actual ratios.

The type of the electrolyte of the lithium ion secondary battery is not particularly limited. The present invention may be applied to any of a liquid electrolyte battery in which a separator is impregnated with a non-aqueous electrolysis solution, a polymer gel electrolyte battery which is also referred to as a polymer battery, and a solid polymer electrolyte (an all solid electrolyte) battery. The polymer gel electrolyte and the solid polymer electrolyte may be used separately, or the separator impregnated with the polymer gel electrolyte or the solid polymer electrolyte may be used.

Figure 2:
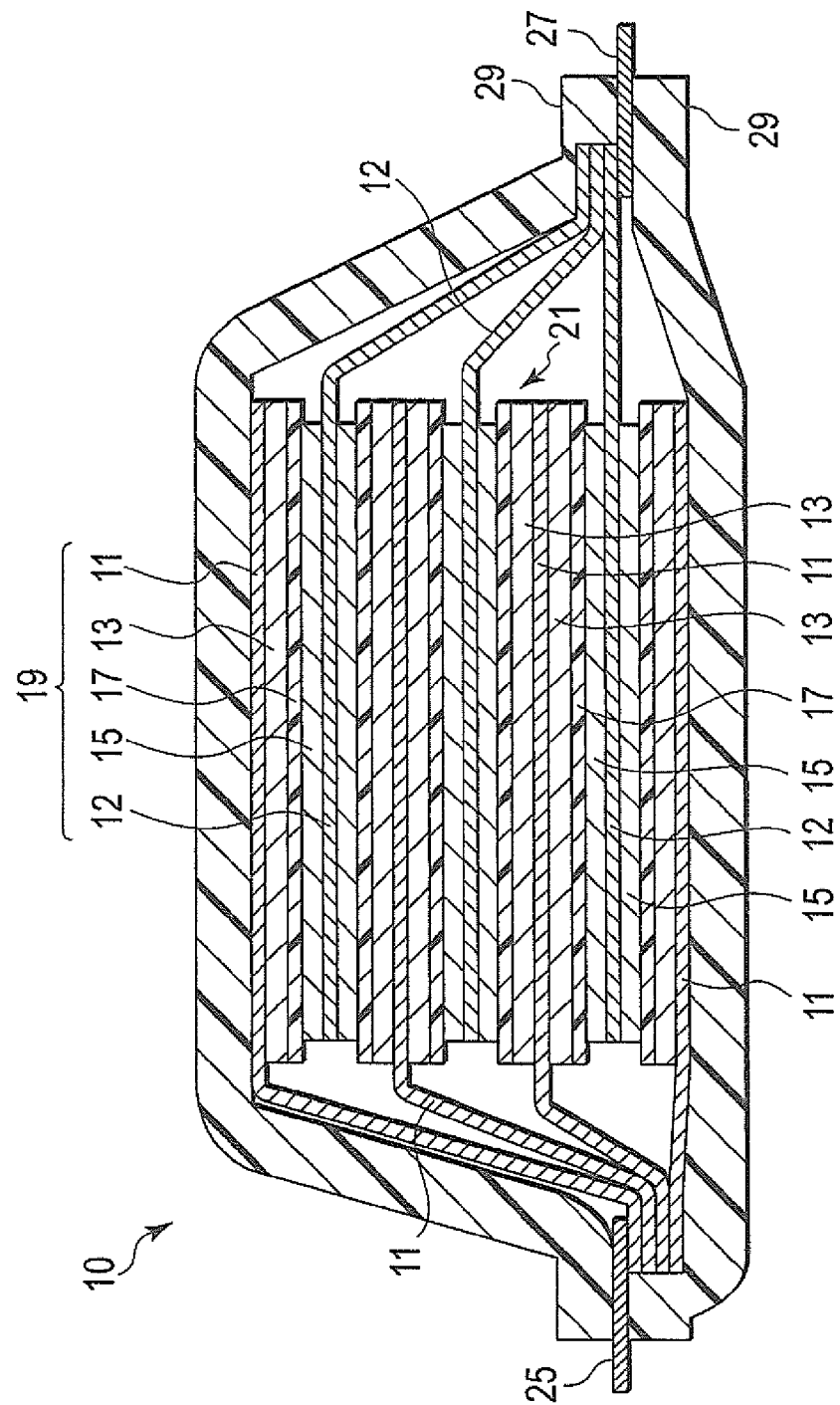
FIG. 2 is a schematic cross-sectional view showing a fundamental configuration of a non-aqueous lithium ion secondary battery which is not a bipolar type but a flat type (a laminated type) as an embodiment of an electric device.

FIG. 2 is a schematic cross-sectional view showing a fundamental configuration of the non-aqueous lithium ion secondary battery which is not a bipolar type but a flat type (a laminated type) (hereinafter, also simply referred to as "a laminated type battery"). As shown in FIG. 2, a laminated battery 10 according to the embodiment has a configuration in which a power generation element 21 having a substantially rectangular shape, in which a charge-discharge reaction actually progresses, is sealed inside a battery exterior member 29. The power generation element 21 has a configuration in which positive electrodes, electrolyte layers 17 and negative electrodes are stacked. Each positive electrode has a configuration in which positive electrode active material layers 13 are provided on both surfaces of a positive electrode current collector 11. Each negative electrode has a configuration in which negative electrode active material layers 15 are provided on both surfaces of a negative electrode current collector 12. In other words, several sets of the positive electrode, the electrolyte layer and the negative electrode arranged in this order are stacked on top of each other in a manner such that one positive electrode active material layer 13 faces the adjacent negative electrode active material layer 15 with the electrolyte layer 17 interposed therebetween. The positive electrode, the electrolyte layer, and the negative electrode which are adjacent to one another thus constitute a single cell layer 19. Namely, the laminated battery 10 shown in FIG. 2 has a constitution in which the plural single cell layers 19 are stacked on top of each other so as to be electrically connected in parallel.

Here, the positive electrode current collectors located on the respective outermost layers of the power generation element 21 are each provided with the positive electrode active material layer 13 only on one side thereof. Alternatively, the positive electrode current collectors may be provided with the positive electrode active material layers 13 on both sides thereof. Namely, the current collectors each provided with the positive electrode active material layers on both sides thereof may be used also as the current collectors at the respective outermost layers, in addition to the case where the current collectors at the respective outermost layers are each provided with the active material layer only on one side thereof. Similarly, the negative electrode current collectors each provided with the negative electrode active material layer on one side or both sides thereof, may be located on the respective outermost layers of the power generation element 21 in a manner such that the positions of the positive electrode and the negative electrode shown in FIG. 2 are reversed.

A positive electrode current collecting plate (tab) 25 and a negative electrode current collecting plate (tab) 27 which are electrically conductive to the respective electrodes (the positive electrode and the negative electrode) are attached to the positive electrode current collectors 11 and the negative electrode current collectors 12 respectively. The positive electrode current collecting plate 25 and the negative electrode current collecting plate 27 are held by each end portion of the battery exterior member 29 and exposed to the outside of the battery exterior member 29. The positive electrode current collecting plate 25 and the negative electrode current collecting plate 27 may be attached to the positive electrode current collectors 11 and the negative electrode current collectors 12 of the respective electrodes via a positive electrode lead and a negative electrode lead (not shown in the figure) as necessary by, for example, ultrasonic welding or resistance welding.

In FIG. 2, the separator with a heat resistant insulation layer composes the electrolyte layer 13 together with the electrolysis solution. The laminated type lithium ion secondary battery shown in FIG. 2 can ensure high safety while having a shutdown function and suppressing heat contraction due to the use of the separator with a heat resistant insulation layer. In addition, the battery can ensure high output performance and cycle performance due to the heat resistant insulation layer containing the inorganic particles and the binder each selected from the materials described above.

Although FIG. 2 shows the laminated battery which is not a bipolar type but a flat type (a laminated type), a bipolar type battery may be used including bipolar electrodes each having a positive electrode active material layer electrically coupled to one surface of a current collector and a negative electrode active material layer electrically coupled to the other surface of the current collector.

The following is a further specific explanation of each constituent member.

[Current Collector]

The material included in the current collector is not particularly limited, but metal is preferably used.

Examples of the metal include aluminum, nickel, iron, stainless steel, titanium, copper, and an alloy thereof. In addition, a clad metal of nickel and aluminum, a clad metal of copper and aluminum, or a plated material of these metals combined together, is preferably used. A foil in which the metal surface is covered with aluminum may also be used. In particular, aluminum, stainless steel and copper are preferable in view of electron conductivity and battery action potential.

The size of the current collector is determined depending on the intended use of the battery. For example, a current collector having a large area is used for a large-size battery required to have high energy density. The thickness of the current collector is not particularly limited. The thickness of the current collector is generally approximately in the range from 1 µm to 100 µm.

[Active Material Layer (Positive Electrode Active Material Layer and Negative Electrode Active Material Layer)]

The positive electrode active material layer or the negative electrode active material layer contains an active material and further contains other additives, as necessary, such as an electric conducting additive, a binder, an electrolyte (such as polymer matrix, an ion-conducting polymer and an electrolysis solution), and lithium salt for improving ion conductivity.

The positive electrode active material layer contains a positive electrode active material. Examples of the positive electrode active material include a lithium-transition metal composite oxide such as $LiMn_2O_4$, $LiCoO_2$, $LiNiO_2$, $Li(Ni-Co-Mn)O_2$ and an oxide in which part of each of these transition metals is substituted with other elements, a lithium-transition metal phosphate compound, and a lithium-transition metal sulfate compound. Two or more kinds of these positive electrode active materials may be used together according to circumstances. In view of the capacity and output performance, the lithium-transition metal composite oxide is preferably used as the positive electrode active material. Note that positive electrode active materials other than those described above may also be used.

The negative electrode active material layer contains a negative electrode active material. Examples of the negative electrode active material include a carbon material such as graphite, soft carbon and hard carbon, a lithium-transition metal composite oxide (such as $Li_4Ti_5O_{12}$), a metal material, and a lithium alloy series negative electrode material. Two or more kinds of these negative electrode active materials may be used together according to circumstances. In view of the capacity and output performance, the carbon material or the lithium-transition metal composite oxide is preferably used as the negative electrode active material. Note that negative electrode active materials other than those described above may also be used.

An average particle diameter of the respective active materials contained in the respective active material layers is not particularly limited; however, it is preferably in the range from 1 μm to 100 μm, more preferably 1 μm to 20 μm, in view of higher output performance.

The positive electrode active material layer or the negative electrode active material layer contains a binder.

The binder used in the respective active material layers is not particularly limited. Examples of the binder include a thermoplastic polymer such as polyethylene, polypropylene, polyethylene terephthalate (PET), polyethernitrile, polyacrylonitrile, polyimide, polyamide, cellulose, carboxymethylcellulose (CMC) and salt thereof, an ethylene-vinyl acetate copolymer, polyvinyl chloride, styrene butadiene rubber (SBR), isoprene rubber, butadiene rubber, ethylene-propylene rubber, an ethylene-propylene-diene copolymer, a styrene-butadiene-styrene block copolymer and a hydrogen additive thereof, and a styrene-isoprene-styrene block copolymer and a hydrogen additive thereof, fluorine resin such as polyvinylidene fluoride (PVDF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride fluoro rubber such as vinylidene fluoride-hexafluoropropylene fluoro rubber (VDF-HFP fluoro rubber), vinylidene fluoride-hexafluoropropylene-tetrafluoroethylene fluoro rubber (VDF-HFP-TFE fluoro rubber), vinylidene fluoride-pentafluoropropylene fluoro rubber (VDF-PFP fluoro rubber), vinylidene fluoride-pentafluoropropylene-tetrafluoroethylene fluoro rubber (VDF-PFP-TFE fluoro rubber), vinylidene fluoride-perfluoromethyl vinyl ether-tetrafluoroethylene fluoro rubber (VDF-PFMVE-TFE fluoro rubber), and vinylidene fluoride-chlorotrifluoroethylene fluoro rubber (VDF-CTFE fluoro rubber), and epoxy resin. Among these, polyvinylidene fluoride, polyimide, styrene-butadiene rubber, carboxymethylcellulose and salt thereof, polypropylene, polytetrafluoroethylene, polyacrylonitrile and polyamide, are particularly preferable. These binders are suitable for use in the active material layers since these binders have high heat resistance, have quite a wide potential window, and are stable with respect to both positive electrode potential and negative electrode potential. The binders may be used alone or in combination of two or more.

The amount of the binder contained in the respective active material layers is not particularly limited as long as it is sufficient to bind the active materials. However, the amount of the binder is preferably in the range from 0.5% to 15% by mass, more preferably in the range from 1% to 10% by mass, with respect to each active material layer.

Examples of the other additives which may be contained in the respective active material layers include an electric conducting additive, electrolyte salt, and an ion-conducting polymer.

The electric conducting additive is an additive added in order to improve electric conductivity in the positive electrode active material layer or the negative electrode active material layer. The electric conducting additive may be a carbon material such as carbon black (such as acetylene black), graphite, and carbon fiber. The addition of the electric conducting additive in the active material layers contributes to effectively establishing an electronic network in the active material layers and improving the output performance of the battery.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion-conducting polymer include a polyethylene oxide (PEO)-based polymer and a polypropylene oxide (PPO)-based polymer.

A mixing ratio of the components contained in each of the positive electrode active material layer and the negative electrode active material layer is not particularly limited. The mixing ratio may be adjusted by appropriately referring to the known findings on lithium ion secondary batteries. The thickness of the respective active material layers is not particularly limited, and the known findings on batteries may be appropriately referred to. As an example, the thickness of the respective active material layers may be approximately in the range from 2 μm to 100 μm.

[Electrolyte Layer]

The electrolyte contained in the electrolyte layer functions as a carrier of lithium ions. The electrolyte is not particularly limited as long as it functions as described above, and may be a liquid electrolyte or a polymer electrolyte.

The liquid electrolyte is in a state in which lithium salt as supporting salt is dissolved in an organic solvent serving as a plasticizer. Examples of the organic solvent used include carbonate such as ethylene carbonate (EC), propylene carbonate (PC), dimethyl carbonate (DMC), diethyl carbonate (DEC), and ethyl methyl carbonate. The lithium salt may also be a compound that can be added to the respective electrode active material layers, such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$. The liquid electrolyte may further contain additives other than the components described above. Specific examples of such compounds include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, arylethylene carbonate, vinyloxymethylethylene carbonate, aryloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methyleneethylene carbonate, and 1,1-dimethyl-2-methyleneethylene carbonate. Among these compounds, vinylene carbonate, methylvinylene carbonate and vinylethylene carbonate are preferable, and vinylene carbonate and vinylethylene carbonate are more preferable. These types of cyclic carbonate may be used alone or in combination of two or more.

The polymer electrolyte is divided into two types; a gel polymer electrolyte (a gel electrolyte) containing an electrolysis solution, and an intrinsic polymer electrolyte not containing an electrolysis solution.

The gel polymer electrolyte has a constitution in which the liquid electrolyte described above is poured into a matrix polymer (a host polymer) including an ion conductive polymer. The use of the gel polymer electrolyte has the advantage of being able to easily interrupt ion conduction between the respective layers since there is no fluidity in the electrolyte. Examples of the ion conductive polymer used for the matrix polymer (the host polymer) include polyethylene oxide (PEO), polypropylene oxide (PPO), and a copolymer thereof. In such a polyalkylene oxide polymer, electrolyte salt such as lithium salt can be dissolved sufficiently.

The intrinsic polymer electrolyte has a constitution in which lithium salt is dissolved in the matrix polymer, but no organic solvent is contained. The use of the intrinsic polymer electrolyte thus contributes to improving the reliability of the battery since leakage from the battery is hardly occurred.

The matrix polymer of the gel electrolyte or the intrinsic polymer electrolyte can ensure high mechanical strength when a cross-linked structure is formed. The cross-linked structure may be formed in a manner such that a polymerizable polymer used for polymer electrolyte formation (for example, PEO and PPO) is subjected to polymerization, such as thermal polymerization, ultraviolet polymerization, radiation polymerization and electron beam polymerization, by use of an appropriate polymerization initiator.

These electrolytes may be used alone or in combination of two or more.

A separator may be used in the electrolyte layer when the electrolyte layer includes the liquid electrolyte or the gel electrolyte. A specific example of the separator may be the separator with a heat resistant insulation layer explained above.

[Positive Electrode Current Collecting Plate and Negative Electrode Current Collecting Plate]

The material constituting the current collecting plates (25, 27) is not particularly limited and may be a highly electrically conductive material conventionally used for current collecting plates for lithium ion secondary batteries. For example, the constituent material for the current collecting plates is preferably a metallic material such as aluminum, copper, titanium, nickel, stainless steel (SUS), or an alloy thereof. The material is more preferably aluminum or copper in view of lightness, corrosion resistance and high electric conductivity, and is particularly preferably aluminum. The positive electrode current collecting plate 25 and the negative electrode current collecting plate 27 may be made from the same material or may be made from different materials.

[Positive Electrode Lead and Negative Electrode Lead]

Although not shown in the figure, the current collectors 11 and the current collecting plates (25, 27) may be electrically connected via the positive electrode lead and the negative electrode lead. The constituent material for the positive electrode lead and the negative electrode lead may be a material similar to that used in conventional lithium ion secondary batteries. Each part exposed to the outside of the battery exterior member is preferably covered with, for example, a heat shrinkable tube having a heat resistant insulation property so as not to have any negative influence on surrounding products (such as components in a vehicle, in particular, electronic devices) caused by a short circuit because of contact with peripheral devices or wires.

[Battery Exterior Member]

As the battery exterior member 29, a conventionally-known metal can casing may be used. Alternatively, a sac-like casing capable of covering the power generation element and using a lamination film containing aluminum may be used. The lamination film may be a film having a three-layer structure in which PP, aluminum and nylon are laminated in this order but is not limited to this. The lamination film is preferred in view of high output power and cooling performance and further suitability for use in a battery for a large device such as EV and HEV.

The lithium ion secondary battery described above can be manufactured by conventionally-known methods.

[Appearance Configuration of Lithium Ion Secondary Battery]

Figure 3:
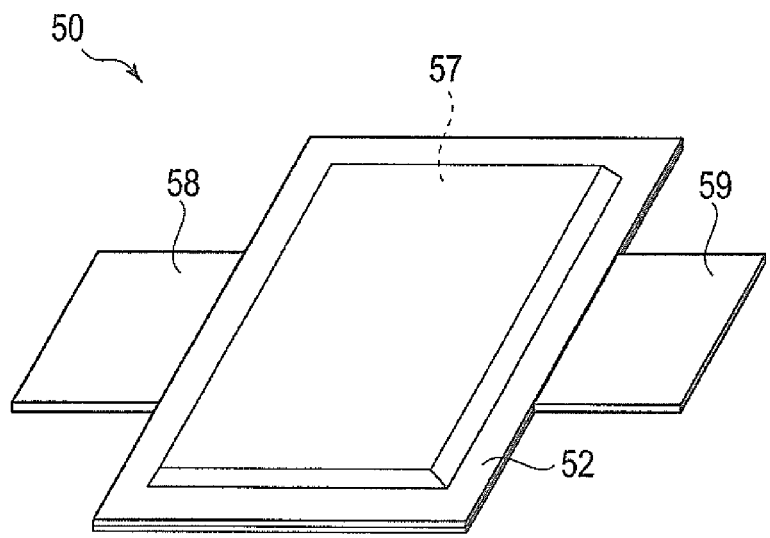
FIG. 3 is a perspective view showing an external appearance of a flat lithium ion secondary battery as an embodiment of an electric device.

FIG. 3 is a perspective view showing an external appearance of a flat type lithium ion secondary battery as a representative embodiment of a secondary battery.

As shown in FIG. 3, the flat lithium ion secondary battery 50 has a flat rectangular shape and includes a positive electrode tab 58 and a negative electrode tab 59 exposed to the outside on both sides of the battery to extract a current. A power generation element 57 is enclosed in a battery exterior member 52 of the lithium ion secondary battery 50 and the periphery thereof is thermally fused. The power generation element 57 is tightly sealed while the positive electrode tab 58 and the negative electrode tab 59 are exposed to the outside thereof. Note that the power generation element 57 corresponds to the power generation element 21 of the lithium ion secondary battery 10 shown in FIG. 2 as explained above. The power generation element 57 is obtained in a manner such that the plural single cell layers (single cells) 19 each including the positive electrode (positive electrode active material layer) 13, the electrolyte layer 17 and the negative electrode (negative electrode active material layer) 15, are stacked on top of each other.

The lithium ion secondary battery is not limited to a laminated flat type battery. A wound type lithium ion secondary battery is not particularly limited and may have a cylindrical shape or may have a flat rectangular shape obtained in such a manner as to deform such a cylindrical battery. The cylindrical battery is not particularly limited and may use a lamination film or a conventional cylindrical can (a metal can) as an exterior member. The power generation element may be preferably covered with an aluminum lamination film. This configuration can contribute to a reduction in weight.

The respective tabs 58 and 59 shown in FIG. 3 are not particularly limited. The configuration of the positive electrode tab 58 and the negative electrode tab 59 is not limited to that shown in FIG. 3, and the positive electrode tab 58 and the negative electrode tab 59 may be exposed to the outside on the same side or may each be divided into several parts so as to be exposed to the outside on each side. The wound type lithium ion battery may include terminals by use of, for example, cylindrical cans (metal cans) instead of the tabs.

The lithium ion secondary battery was exemplified as an electric device in the present embodiment. However, the present embodiment is not limited to this and is applicable to secondary batteries of other types and, further, to primary batteries. In addition, the present embodiment is applicable not only to batteries but also to electric double-layer capacitors, hybrid capacitors or lithium ion capacitors.

[Assembled Battery]

An assembled battery is obtained in such a manner as to connect a plurality of batteries. In particular, the assembled battery includes at least two batteries which are connected in series, in parallel, or in series and parallel. Accordingly, the capacity and the voltage can be adjusted freely due to the series or parallel connection.

Further, a detachable small-size assembled battery in which plural batteries are connected in series or in parallel may be formed. Further, the plural detachable small-size assembled batteries may be connected in series or in parallel so as to manufacture an assembled battery having a larger capacity and larger output power suitable for a driving power source or an auxiliary power source of a vehicle required to have higher volume energy density and higher volume output density. The number of the batteries to be connected to manufacture the assembled battery or the number of the small-sized assembled batteries to be stacked to manufacture the large-capacity assembled battery, may be determined depending on the battery capacity and output power of a vehicle (an electric vehicle) on which these batteries are mounted.

[Vehicle]

The electric device described above has high output performance, and has high cycle performance due to the capability to keep the discharge capacity even if used for a long period of time. Electric devices for use in vehicles such as electric vehicles, hybrid electric vehicles, fuel cell vehicles or hybrid fuel cell vehicles, are required to have a larger capacity, a larger size and longer life, compared with those for use in electric/mobile electronic equipment. Therefore, the electric device described above is suitable for use in a power source for a vehicle such as a driving power source or an auxiliary power source.

In particular, the battery or the assembled battery including the plurality of these batteries assembled together may be mounted on a vehicle. According to the present invention, the installation of such long-life batteries having long-term reliability and high output performance can provide plug-in hybrid electric vehicles capable of long-distance EV driving and electric vehicles capable of long-distance one-charge driving. The present invention can contribute to long life and high reliability by applying the battery or the assembled battery including the plurality of these batteries assembled together to, for example, vehicles such as hybrid vehicles, fuel cell vehicles and electric vehicles (each including not only four-wheel vehicles (for example, passenger cars, commercial vehicles such as trucks and buses, and light vehicles) but also two-wheel vehicles (motor cycles) and three-wheel vehicles). However, the application of the batteries is not limited to these vehicles, and the batteries may be used as other power sources for use in, for example, transportation including trains or may be used as on-board power sources such as uninterruptible power supply systems.

EXAMPLES

The electrodes described above will be explained in more detail with reference to the following examples and comparative examples. However, the present invention is not limited only to the following examples.

Example 1

First, 95 parts by mass of alumina particles as inorganic particles (BET specific surface area: 5 m$^2$/g, average particle diameter: 2 μm) and 5 parts by mass of carboxymethylcellulose as a binder (the moisture content per mass of the binder: 9.12% by mass, manufactured by Nippon Paper Chemicals Co., Ltd., SUNROSE (registered trademark) MAC series) were uniformly dispersed in water so as to prepare an aqueous solution. The aqueous solution thus obtained was applied to both surfaces of a polyethylene (PE) microporous film (thickness: 18 μm, porosity: 55%) by use of a gravure coater. The film thus obtained was dried at 60° C. to remove water therefrom, so as to prepare a separator with a heat resistant insulation layer, as a multi-layer microporous film, having a total thickness of 25 μm in which heat resistant insulation layers each having a thickness of 3.5 μm were formed on both surfaces of the microporous film (the weight of the heat resistant insulation layers: 10 g/m$^2$).

It should be noted that the BET specific surface area of the inorganic particles was measured by the following measurement method.

Measuring device: ASAP-2010 manufactured by Micromeritics

Adsorption gas: $N_2$

Dead volume measurement gas: He

Adsorption temperature: 77 K (liquid nitrogen temperature)

Pre-measurement treatment: drying in vacuum at 200° C. for 12 hours (set to measurement stage after He purge)

Measurement mode: absorption process and desorption process at equivalent temperature Measurement relative pressure P/P0: approximately 0 to 0.99

Equilibrium set time: 180 sec per relative pressure

Example 2

A separator with a heat resistant insulation layer of this example was prepared in the same manner as Example 1 except that alumina particles having a BET specific surface area of 7 m$^2$/g were used.

Example 3

A separator with a heat resistant insulation layer of this example was prepared in the same manner as Example 1 except that alumina particles having a BET specific surface area of 15 m$^2$/g were used.

Example 4

A separator with a heat resistant insulation layer of this example was prepared in the same manner as Example 1 except that alumina particles having a BET specific surface area of 30 m$^2$/g were used.

Example 5

A separator with a heat resistant insulation layer of this example was prepared in the same manner as Example 1 except that an aqueous solution obtained in a manner such that 97 parts by mass of alumina particles (BET specific surface area: 5 m$^2$/g) and 3 parts by mass of carboxymethylcellulose were uniformly dispersed in water, was used.

Example 6

A separator with a heat resistant insulation layer of this example was prepared in the same manner as Example 3 except that an aqueous solution obtained in a manner such that 97 parts by mass of alumina particles (BET specific surface area: 15 m$^2$/g) and 3 parts by mass of carboxymethylcellulose were uniformly dispersed in water, was used.

Example 7

A separator with a heat resistant insulation layer of this example was prepared in the same manner as Example 1 except that alumina particles having a BET specific surface area of 10 m$^2$/g were used.

Example 8

A separator with a heat resistant insulation layer of this example was prepared in the same manner as Example 1 except that alumina particles having a BET specific surface area of 20 m$^2$/g were used.

Example 9

A separator with a heat resistant insulation layer of this example was prepared in the same manner as Example 1 except that a solution obtained in a manner such that 95 parts by mass of alumina particles (BET specific surface area: 5 m$^2$/g) and 5 parts by mass of polyvinylidene fluoride (the moisture content per mass of the binder: 2.89% by mass; KF series, manufactured by Kureha Corporation) were uniformly dispersed in N-methylpyrrolidone (NMP), was used.

Example 10

A separator with a heat resistant insulation layer of this example was prepared in the same manner as Example 9 except that alumina particles having a BET specific surface area of 7 m$^2$/g were used.

Example 11

A separator with a heat resistant insulation layer of this example was prepared in the same manner as Example 9 except that alumina particles having a BET specific surface area of 15 m$^2$/g were used.

Example 12

A separator with a heat resistant insulation layer of this example was prepared in the same manner as Example 9 except that alumina particles having a BET specific surface area of 30 m$^2$/g were used.

Example 13

A separator with a heat resistant insulation layer of this example was prepared in the same manner as Example 9 except that a solution obtained in a manner such that 97 parts by mass of alumina particles (BET specific surface area: 5 m$^2$/g) and 3 parts by mass of polyvinylidene fluoride were uniformly dispersed in NMP, was used.

Example 14

A separator with a heat resistant insulation layer of this example was prepared in the same manner as Example 11 except that a solution obtained in a manner such that 97 parts by mass of alumina particles (BET specific surface area: 15 m$^2$/g) and 3 parts by mass of polyvinylidene fluoride were uniformly dispersed in NMP, was used.

Example 15

A separator with a heat resistant insulation layer of this example was prepared in the same manner as Example 9 except that a solution obtained in a manner such that 90 parts by mass of alumina particles (BET specific surface area: 5 m$^2$/g) and 10 parts by mass of polyvinylidene fluoride were uniformly dispersed in NMP, was used.

Example 16

A separator with a heat resistant insulation layer of this example was prepared in the same manner as Example 9 except that a solution obtained in a manner such that 85 parts by mass of alumina particles (BET specific surface area: 5 m$^2$/g) and 15 parts by mass of polyvinylidene fluoride were uniformly dispersed in NMP, was used.

Example 17

A separator with a heat resistant insulation layer of this example was prepared in the same manner as Example 1 except that a solution obtained in a manner such that 95 parts by mass of alumina particles (BET specific surface area: 5 m$^2$/g) and 5 parts by mass of polymethyl acrylate (the moisture content per mass of the binder: 0.46% by mass) were uniformly dispersed in N-methylpyrrolidone (NMP), was used.

Example 18

A separator with a heat resistant insulation layer of this example was prepared in the same manner as Example 17 except that alumina particles having a BET specific surface area of 7 m$^2$/g were used.

Example 19

A separator with a heat resistant insulation layer of this example was prepared in the same manner as Example 17 except that alumina particles having a BET specific surface area of 15 m$^2$/g were used.

Example 20

A separator with a heat resistant insulation layer of this example was prepared in the same manner as Example 17 except that alumina particles having a BET specific surface area of 30 m$^2$/g were used.

Example 21

A separator with a heat resistant insulation layer of this example was prepared in the same manner as Example 17 except that alumina particles having a BET specific surface area of 50 m$^2$/g were used.

Example 22

A separator with a heat resistant insulation layer of this example was prepared in the same manner as Example 17 except that a solution obtained in a manner such that 97 parts by mass of alumina particles (BET specific surface area: 5 m$^2$/g) and 3 parts by mass of polymethyl acrylate were uniformly dispersed in N-methylpyrrolidone (NMP), was used.

Example 23

A separator with a heat resistant insulation layer of this example was prepared in the same manner as Example 19 except that a solution obtained in a manner such that 97 parts by mass of alumina particles (BET specific surface area: 15 m$^2$/g) and 3 parts by mass of polymethyl acrylate were uniformly dispersed in NMP, was used.

Example 24

A separator with a heat resistant insulation layer of this example was prepared in the same manner as Example 17 except that a solution obtained in a manner such that 90 parts by mass of alumina particles (BET specific surface area: 5 m$^2$/g) and 10 parts by mass of polymethyl acrylate were uniformly dispersed in NMP, was used.

Example 25

A separator with a heat resistant insulation layer of this example was prepared in the same manner as Example 17 except that a solution obtained in a manner such that 85 parts by mass of alumina particles (BET specific surface area: 5 m$^2$/g) and 15 parts by mass of polymethyl acrylate were uniformly dispersed in NMP, was used.

Example 26

A separator with a heat resistant insulation layer of this example was prepared in the same manner as Example 1 except that a solution obtained in a manner such that 95 parts by mass of alumina particles (BET specific surface area: 5 m$^2$/g) and 5 parts by mass of polyethyl acrylate (the moisture content per mass of the binder: 0.19% by mass) were uniformly dispersed in N-methylpyrrolidone (NMP), was used.

Example 27

A separator with a heat resistant insulation layer of this example was prepared in the same manner as Example 26 except that alumina particles having a BET specific surface area of 15 m$^2$/g were used.

Example 28

A separator with a heat resistant insulation layer of this example was prepared in the same manner as Example 26 except that alumina particles having a BET specific surface area of 30 m$^2$/g were used.

Example 29

A separator with a heat resistant insulation layer of this example was prepared in the same manner as Example 26 except that alumina particles having a BET specific surface area of 50 m$^2$/g were used.

Note that the respective alumina particles having the BET specific surface areas of 5, 10, 15, 20, 30 and 50 m$^2$/g in Examples described above were obtained in such a manner as to set the baking temperature of aluminum hydroxide to 1200° C., 1180° C., 1150° C., 1070° C., 1050° C. and 1020° C., respectively.

Comparative Example 1

A separator with a heat resistant insulation layer of this example was prepared in the same manner as Example 1 except that a solution obtained in a manner such that 80 parts by mass of alumina particles (BET specific surface area: 5 m$^2$/g) and 20 parts by mass of carboxymethylcellulose were uniformly dispersed in water, was used.

Comparative Example 2

A separator with a heat resistant insulation layer of this example was prepared in the same manner as Example 9 except that a solution obtained in a manner such that 80 parts by mass of alumina particles (BET specific surface area: 5 m$^2$/g) and 20 parts by mass of polyvinylidene fluoride were uniformly dispersed in NMP, was used.

Comparative Example 3

A separator with a heat resistant insulation layer of this example was prepared in the same manner as Example 1 except that alumina particles having a BET specific surface area of 60 m$^2$/g were used.

Comparative Example 4

A separator with a heat resistant insulation layer of this example was prepared in the same manner as Example 26 except that alumina particles having a BET specific surface area of 1 m$^2$/g were used.

Comparative Example 5

A separator with a heat resistant insulation layer of this example was prepared in the same manner as Example 1 except that alumina particles having a BET specific surface area of 4 m$^2$/g were used, and a solution obtained in a manner such that 85 parts by mass of the alumina particles and 15 parts by mass of the binder were uniformly dispersed in water, was used.

Comparative Example 6

A separator with a heat resistant insulation layer of this example was prepared in the same manner as Example 1 except that alumina particles having a BET specific surface area of 50 m$^2$/g were used, and a solution obtained in a manner such that 85 parts by mass of the alumina particles and 15 parts by mass of polybutyl acrylate (the moisture content per mass of the binder: 0.049% by mass) were uniformly dispersed in N-methylpyrrolidone (NMP), was used.

Note that the respective alumina particles having the BET specific surface areas of 1, 4 and 60 m$^2$/g in Comparative Examples described above were obtained in such a manner as to set the baking temperature of aluminum hydroxide to 1300° C., 1230° C. and 1010° C., respectively.

(Production of Lithium Ion Secondary Battery)

(1) Production of Positive Electrode—First, 85.0% by mass of a lithium-manganese composite oxide (LiMn$_2$O$_4$) as a positive electrode active material, 5.0% by mass of acetylene black as an electric conducting additive, and 10.0% by mass of polyvinylidene fluoride (PVDF) as a binder were dispersed in N-methylpyrrolidone (NMP) so as to prepare slurry.

The slurry thus obtained was applied by a die coater to one surface of an aluminum foil serving as a positive electrode current collector and having a thickness of 20 μm, dried and then pressed with a roll press so that the thickness of the electrode on one side was 60 μm.

(2) Production of Negative Electrode—Next, 90.0% by mass of graphite as a negative electrode active material, and 10% by mass of PVDF as a binder were dispersed in N-methylpyrrolidone (NMP) so as to prepare slurry.

The slurry thus obtained was applied by a die coater to one surface of a copper foil serving as a negative electrode current collector and having a thickness of 10 μm, dried and then pressed with a roll press so that the thickness of the electrode on one side was 50 μm.

(3) Production of Non-aqueous Electrolysis Solution—A non-aqueous electrolysis solution was prepared in a manner such that LiPF$_5$ as a solute was dissolved in a mixed solvent of ethylene carbonate and diethyl carbonate in the ratio 1:2 (volume ratio) in such a manner as to set the concentration of LiPF$_5$ to 1.0 ml/L and obtain 1.5% by mass of vinylene carbonate (with respect to 100% by mass of the mixed solvent).

(4) Production of Test Cell—The separator with a heat resistant insulation layer prepared in each of Examples and Comparative Examples was interposed between the positive electrode and the negative electrode as produced above so as to produce a power generation element.

The power generation element thus obtained was installed in a bag made of an aluminum lamination sheet as an exterior member, and the prepared electrolysis solution was poured therein. Then, the opening of the bag made of the aluminum lamination sheet was sealed under a vacuum condition in a manner such that current extraction tabs connected to the respective electrodes were exposed to the outside of the bag, so as to finish the test cell as a laminated type lithium ion secondary battery.

[Evaluation of Output Performance and Cycle Performance]

The respective laminated batteries were subjected to initial charge and discharge at a constant current of 0.5 C for five hours (upper limit voltage of each layer: 4.2 V). Next, the respective batteries were subjected to degassing and then discharged at 0.2 C and at 2 C after fully charged so as to evaluate the output performance.

Figure 4:
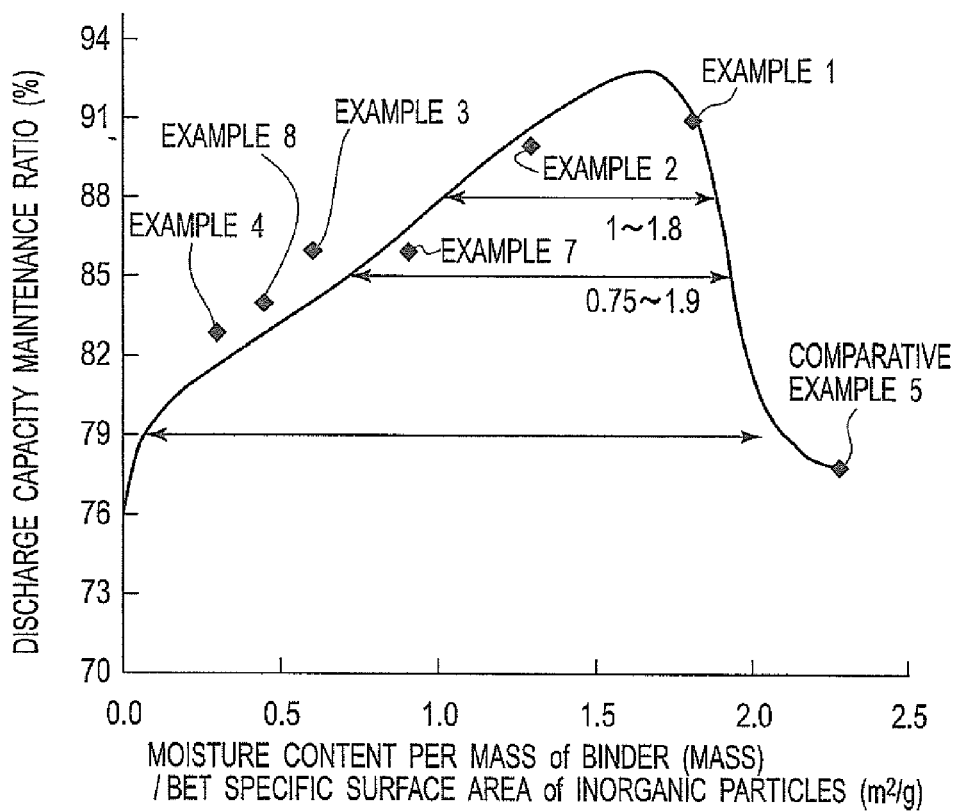
FIG. 4 is a view showing a relationship between a moisture balance ratio and cycle performance of a battery in each of examples and comparative examples.

Thereafter, the batteries were each charged at 25° C. at the upper limit charge voltage of 4.2 V and then discharged at 1 C. This procedure was regarded as a single cycle, and the cycle was repeated 150 times. The ratio of the discharge capacity after predetermined cycles to the discharge capacity of the first cycle was obtained as a capacity maintenance ratio (%). Table 1 and Table 2 show the results thereof. FIG. 4 shows a relationship between the moisture balance ratio and the cycle performance when the separator with a heat resistant insulation layer prepared in each of Examples and Comparative Examples was applied to the cell.

TABLE 1

|  | BET Specific Surface Area m$^2$/g | Type of Binder | Inorganic Particles:Binder (Mass Ratio) | Moisture Balance Ratio | Output Performance/0.2 C Ratio | Discharge Capacity Maintenance Ratio/% |
| --- | --- | --- | --- | --- | --- | --- |
| Example 1 | 5 | CMC | 95:5 | 1.824 | 86 | 91 |
| Example 2 | 7 | CMC | 95:5 | 1.303 | 87 | 90 |
| Example 3 | 15 | CMC | 95:5 | 0.608 | 85 | 86 |
| Example 4 | 30 | CMC | 95:5 | 0.304 | 84 | 83 |
| Example 5 | 5 | CMC | 97:3 | 1.824 | 88 | 88 |
| Example 6 | 15 | CMC | 97:3 | 0.608 | 89 | 85 |
| Example 7 | 10 | CMC | 95:5 | 0.912 | 88 | 86 |
| Example 8 | 20 | CMC | 95:5 | 0.456 | 87 | 84 |
| Example 9 | 5 | PVDF | 95:5 | 0.578 | 85 | 92 |
| Example 10 | 7 | PVDF | 95:5 | 0.413 | 84 | 91 |
| Example 11 | 15 | PVDF | 95:5 | 0.193 | 85 | 87 |
| Example 12 | 30 | PVDF | 95:5 | 0.096 | 86 | 86 |
| Example 13 | 5 | PVDF | 97:3 | 0.578 | 91 | 82 |
| Example 14 | 15 | PVDF | 97:3 | 0.193 | 92 | 83 |
| Example 15 | 5 | PVDF | 90:10 | 0.578 | 81 | 85 |
| Example 16 | 5 | PVDF | 85:15 | 0.578 | 76 | 83 |
| Example 17 | 5 | PMA | 95:5 | 0.092 | 84 | 92 |

TABLE 2

|  | BET Specific Surface Area m2/g | Type of Binder | Inorganic Particles:Binder (Mass Ratio) | Moisture Balance Ratio | Output Performance/0.2 C Ratio | Discharge Capacity Maintenance Ratio/% |
| --- | --- | --- | --- | --- | --- | --- |
| Example 18 | 7 | PMA | 95:5 | 0.066 | 83 | 91 |
| Example 19 | 15 | PMA | 95:5 | 0.031 | 85 | 89 |
| Example 20 | 30 | PMA | 95:5 | 0.015 | 86 | 88 |
| Example 21 | 50 | PMA | 95:5 | 0.009 | 85 | 85 |
| Example 22 | 5 | PMA | 97:3 | 0.092 | 88 | 88 |
| Example 23 | 15 | PMA | 97:3 | 0.031 | 89 | 86 |
| Example 24 | 5 | PMA | 90:10 | 0.092 | 80 | 84 |
| Example 25 | 5 | PMA | 85:15 | 0.092 | 76 | 83 |
| Example 26 | 5 | Polyethyl Acrylate | 95:5 | 0.038 | 85 | 92 |
| Example 27 | 15 | Polyethyl Acrylate | 95:5 | 0.013 | 84 | 91 |

TABLE 2-continued

|  | BET Specific Surface Area m2/g | Type of Binder | Inorganic Particles:Binder (Mass Ratio) | Moisture Balance Ratio | Output Performance/0.2 C Ratio | Discharge Capacity Maintenance Ratio/% |
|---|---|---|---|---|---|---|
| Example 28 | 30 | Polyethyl Acrylate | 95:5 | 0.006 | 84 | 88 |
| Example 29 | 50 | Polyethyl Acrylate | 95:5 | 0.004 | 85 | 87 |
| Comparative Example 1 | 5 | CMC | 80:20 | 1.824 | 65 | 75 |
| Comparative Example 2 | 5 | PVDF | 80:20 | 0.578 | 66 | 76 |
| Comparative Example 3 | 60 | CMC | 95:5 | 0.152 | 84 | 70 |
| Comparative Example 4 | 1 | Polyethyl Acrylate | 95:5 | 0.190 | 86 | 74 |
| Comparative Example 5 | 4 | CMC | 85:15 | 2.280 | 71 | 78 |
| Comparative Example 6 | 50 | Polybutyl Acrylate | 85:15 | 0.00098 | 72 | 76 |

It is apparent from the results that the batteries of Examples 1 to 29 each have high cycle performance and output performance. In contrast, the batteries of Comparative Examples 1 to 6, in which the content mass ratio of the binder in the heat resistant insulation layer, the BET specific surface area of the inorganic particles, or the moisture balance ratio does not fulfill the requirements, have lower output performance and/or cycle performance compared with the batteries of Examples.

FIG. 4 shows the relationship between the moisture balance ratio and the discharge capacity maintenance ratio of the separator with a heat resistant insulation layer using, as a binder, carboxymethylcellulose which is a water-soluble copolymer in each of Examples 1 to 4, 7, 8 and Comparative Example 5. It is apparent from FIG. 4 that, when the moisture balance ratio is in the range from 0.75 to 1.9, the discharge capacity maintenance ratio increases to 85% or higher so that the cycle performance is improved. In addition, when the moisture balance ratio is in the range from 1 to 1.8, the discharge capacity maintenance ratio increases to 88% or higher so that the cycle performance is further improved.

Although the present invention has been described above by reference to the examples, the present invention is not limited to the descriptions thereof, and it will be apparent to those skilled in the art that various modifications and improvements can be made.

According to the present invention, the detail moisture content in each of the inorganic particles and the binder in the heat resistant insulation layer is controlled appropriately so that the problem occurred in association with the increase in amount of adsorption moisture can be prevented sufficiently. In particular, the output performance and the long cycle performance can be improved concurrently when the separator is applied to electric devices. Accordingly, the present invention is industrially applicable.

The invention claimed is:

1. A separator with a heat resistant insulation layer, comprising:
    a porous substrate; and
    a heat resistant insulation layer formed on one surface or both surfaces of the porous substrate and containing inorganic particles and a binder,
    wherein a content mass ratio of the inorganic particles to the binder in the heat resistant insulation layer is in a range from 99:1 to 85:15,
    a BET specific surface area of the inorganic particles is in a range from 3 $m^2/g$ to 50 $m^2/g$, and
    a ratio of a moisture content per mass of the binder to the BET specific surface area of the inorganic particles is greater than 0.0001 and smaller than 2.

2. The separator with a heat resistant insulation layer according to claim 1, wherein the binder is a water-soluble polymer.

3. The separator with a heat resistant insulation layer according to claim 2, wherein the water-soluble polymer is at least one of carboxymethylcellulose and salt thereof.

4. The separator with a heat resistant insulation layer according to claim 3, wherein the ratio of the moisture content per mass of the binder to the BET specific surface area of the inorganic particles is in the range from 0.75 to 1.9.

5. The separator with a heat resistant insulation layer according to claim 4, wherein the ratio of the moisture content per mass of the binder to the BET specific surface area of the inorganic particles is in the range from 1 to 1.8.

6. The separator with a heat resistant insulation layer according to claim 1, wherein the inorganic particles are at least one material selected from the group consisting of an oxide, a hydroxide and a nitride of silicon, aluminum, zirconium or titanium, and a complex thereof.

7. The separator with a heat resistant insulation layer according to claim 1, wherein a weight of the heat resistant insulation layer is in a range from 5 $g/m^2$ to 15 $g/m^2$.

8. An electric device using the separator with a heat resistant insulation layer according to claim 1.

9. The separator with a heat resistant insulation layer according to claim 1, wherein the ratio of the moisture content per mass of the binder to the BET specific surface area of the inorganic particles is in the range from 0.75 to 1.9.

10. The separator with a heat resistant insulation layer according to claim 9, wherein the ratio of the moisture content per mass of the binder to the BET specific surface area of the inorganic particles is in the range from 1 to 1.8.

* * * * *